US012731279B2

(12) United States Patent
Nir

(10) Patent No.: US 12,731,279 B2
(45) Date of Patent: Sep. 8, 2026

(54) SEGMENTATION-BASED GENERATION OF BOUNDING SHAPES

(71) Applicant: AUTOBRAINS TECHNOLOGIES LTD, Tel Aviv-Jaffa (IL)

(72) Inventor: Michal Nir, Tel Aviv (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 288 days.

(21) Appl. No.: 18/423,204

(22) Filed: Jan. 25, 2024

(65) Prior Publication Data

US 2024/0257378 A1 Aug. 1, 2024

Related U.S. Application Data

(60) Provisional application No. 63/481,789, filed on Jan. 26, 2023.

(51) Int. Cl.

*G06V 10/26* (2022.01)
*G06T 7/12* (2017.01)
*G06T 7/194* (2017.01)
*G06T 7/50* (2017.01)
*G06T 7/60* (2017.01)
(Continued)

(52) U.S. Cl.

CPC .................. *G06T 7/60* (2013.01); *G06T 7/12* (2017.01); *G06T 7/194* (2017.01); *G06T 7/50* (2017.01); *G06T 7/70* (2017.01); *G06V 10/26* (2022.01); *G06V 10/82* (2022.01); *G06V 20/58* (2022.01); *G06T 2207/20081* (2013.01); *G06T 2207/20084* (2013.01); *G06T 2207/20132* (2013.01);
(Continued)

(58) Field of Classification Search

CPC .. G06T 7/60; G06T 7/12; G06T 7/194; G06T 7/50; G06T 7/70; G06T 7/11; G06T 2207/20081; G06T 2207/20084; G06T 2207/20132; G06T 2207/30256; G06V 10/26; G06V 10/82; G06V 10/25; G06V 20/58; G06V 20/588; G06V 2201/10
See application file for complete search history.

(56) References Cited

U.S. PATENT DOCUMENTS

2014/0056520 A1* 2/2014 Rodriguez Serrano ...................... G06V 10/771 382/173
2017/0297488 A1* 10/2017 Wang ........................ G06T 5/80
(Continued)

OTHER PUBLICATIONS

Wang et al, Detection and Classification of Moving Vehicle From Video Using Multiple Spatio-Temporal Features, 2019, IEEE Digital Object Identifier, pp. 1-13. (Year: 2019).*
(Continued)

*Primary Examiner* — Kathleen M Broughton
(74) *Attorney, Agent, or Firm* — RECHES PATENTS

(57) ABSTRACT

A method that is computer implemented and for segmentation-based generation of bounding shapes, the method includes (i) obtaining a bounding shape that bounds an object captured in a sensed information unit; (ii) generating a cropped image in correspondence with the bounding shape; (iii) segmenting the cropped image to a cropped image background and a cropped image foreground; and (iv) generating an updated bounding shape in correspondence with the cropped image, using the segmentation, the updated bounding shape surrounding the cropped image foreground of the cropped image.

20 Claims, 8 Drawing Sheets

130

(51) Int. Cl.
*G06T 7/70* (2017.01)
*G06V 10/82* (2022.01)
*G06V 20/58* (2022.01)
*G06V 20/56* (2022.01)

(52) U.S. Cl.
CPC .. *G06T 2207/30256* (2013.01); *G06V 20/588* (2022.01); *G06V 2201/10* (2022.01)

(56) References Cited

U.S. PATENT DOCUMENTS

| | | | | |
|---|---|---|---|---|
| 2018/0150716 | A1* | 5/2018 | Farooqi | G06V 10/255 |
| 2019/0130165 | A1* | 5/2019 | Seshadri | G06F 18/24133 |
| 2019/0347501 | A1* | 11/2019 | Kim | G06F 3/011 |
| 2020/0175326 | A1* | 6/2020 | Shen | G05D 1/2435 |
| 2020/0393845 | A1* | 12/2020 | Wang | G06T 7/30 |
| 2022/0351526 | A1* | 11/2022 | Bar Zvi | G06V 20/582 |

OTHER PUBLICATIONS

Chien et al, On Improving Bounding Box Regression Towards Accurate Object Detection Tracking, 2019 Int. Conference on Image and Vision Computing New Zealand, pp. 1-7. (Year: 2019).*

* cited by examiner

300

400

SEGMENTATION-BASED GENERATION OF BOUNDING SHAPES

BACKGROUND

Autonomous vehicles and/or driver assistance systems are required to detect objects within the field of view of their cameras. The object detection may benefit from evaluating the dimensions of the objects and/or the distance from. For example—it may be beneficial to distinguish between an adult and a child—using their height—as the behavior of a child may be less predictable than the behavior of an adult. The difference between the behavior of a chine and an adult may impact the manner in which an autonomous vehicle should drive at the presence of a road user that is a pedestrian. The same applies to a driver assistance system.

Various object detection methods generate a bounding box that delimits the object. The dimensions of the bounding box are commonly used as the dimensions of the object.

The accuracy of the bounding box is limited and using the dimensions of the bounding boxes as the dimensions of the object nay result in various errors.

There is a growing need to provide an accurate method for determining a dimension of a bounding box.

SUMMARY

There may be provided a method, a system and a non-transitory computer readable medium for segmentation-based generation of bounding shapes.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1A:
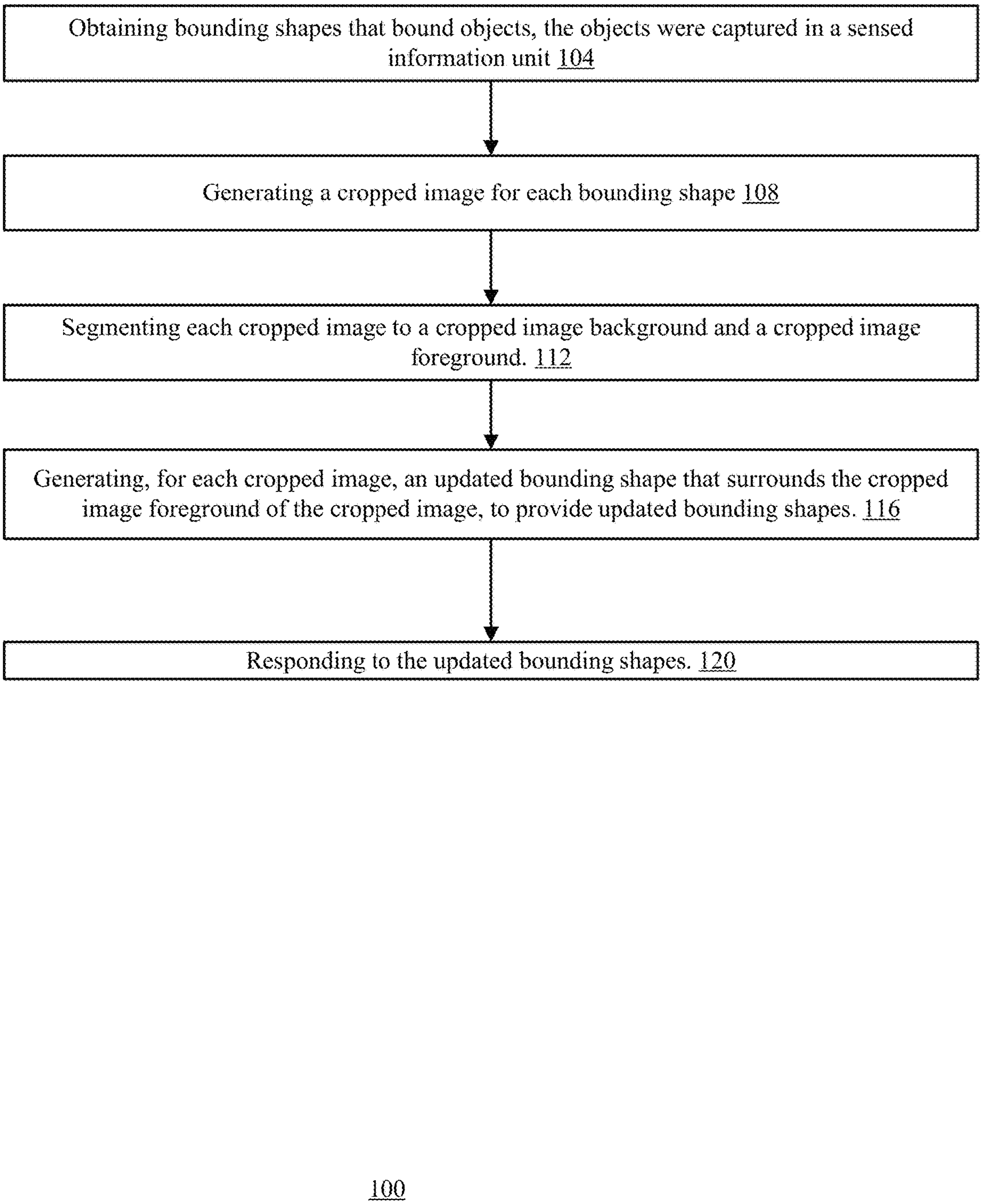
FIG. 1A illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The specification and/or drawings may refer to a processor. The processor may be a processing circuit. The processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The specification and/or drawings may refer to a sensed information unit. In the content of driving—the sensed information unit may capture or may be indicative of a natural signal such as but not limited to signal generated by nature, signal representing humans and/or human behaviors, signals indicative of an environment of a vehicle, and the like. Examples of such sensed information units may include a radiation generated image such as a radar image, a sonar image, a visible light image, an infrared image, a thermal image, an ultraviolet image, a virtual reality augmented image, and the like. A non-image sensed information unit may be captured. Examples of sensors include radiation sensors such as radar, sonar, visual light camera, infrared sensor, ultrasound sensor, electro-optics sensor, LIDAR (light detection and ranging), etc.

There may be provided a system, a method, and a non-transitory computer readable medium for segmentation-based generation of bounding shapes.

FIG. 1A illustrates an example of method 100 for segmentation-based generation of bounding shapes.

Method 100 may start by step 104 of obtaining bounding shapes that bound objects, the objects were captured in a sensed information unit.

Step 104 may include sensing the sensed information unit or receiving the sensed information unit (SIU), and the like. Any method for generating bounding shapes may be applied.

The SIU may be sensed by a vehicle sensor or by a sensor located outside the vehicle.

The bounding shapes may be of any shape—box, polygon, circle, curved shapes or any combination of linear and non-linear shape segments.

The bounding boxes may be generated in any manner—for example by one or more machine learning processes—for example an object detection neural network.

Step 104 may be followed by step 108 of generating a cropped image for each bounding shape. Accordingly—when there are multiple bounding shapes that surround multiple objects (captured by the SIU) there are multiple cropped images.

A cropped image may consist (or may consist essentially of) the bounding shape (pixels of the SIU within the bounding shape) and insignificant content outside the boudin shape.

A cropped image may consist essentially of the bounding shape by including a margin. The pixels of the SIU within the margin may be maintained as in the SIU. The margin may be shaped as sized to compensate for inaccuracies of the generation of the bounding box and/or for compensating for SIU noise or inaccuracies (such as sensor or object misalignment—for example tilt angle).

A margin may be much smaller than a bounding shape—for example may have a dimension (for example height or width) that is up to 2, 5, 10, 15, 20, 25 percent of a corresponding dimension of the bounding shape. May be, for example, include pixels of up to 1, 2, 3, 4—or any other insignificant amount of rows or columns. Smaller bounding boxes may be associated with smaller margins—or may not have margins, and the like.

Step 108 may be followed by step 112 of segmenting each cropped image to a cropped image background and a cropped image foreground.

The segmentation may include classifying pixels to background pixels and foreground pixels. A cropped image will preserve the foreground pixels.

The segmenting may be based, at least in part, on object metadata generated during a generation of the bounding boxes. Examples of such object metadata may include bounding shape width, bounding shape height, object class.

Alternatively, the segmenting may be agnostic to object metadata generated during a generation of the bounding shapes.

Step 112 may be followed by step 116 of generating, for each cropped image, an updated bounding shape that surrounds the cropped image foreground of the cropped image, to provide updated bounding shapes. The updated bounding shapes are calculated based on the cropped images that include or consist essentially or consists of the content of the bounding shapes and maybe a certain margin. The reduced content on which step 116 operates and the allocation of a dedicated cropped image per object may dramatically improve the accuracy of the creation of the updated bounding boxes. In addition—the execution of step 116 may be tailored to certain objects—for example vehicles, pedestrian, road signs, and the like. The tailoring may assist the accuracy of one or more machine learning processes that execute step 116. The tailoring is applicable to both supervised training and unsupervised training.

Step 116 may be followed by step 120 of responding to the updated bounding shapes.

Step 120 may include at least one of:

- Storing the updated bounding boxes.
- Processing the updated bounding shapes to provide a driving related content.
- Determining at least one distance between a sensor that acquired the sensed information unit and at least one of the objects.
- Determining at least one distance between the sensor and the at least one object by detecting a location of a horizon within the image, and using the horizon to determine the at least one distance. The horizon can be viewed in a SIU such as an visible light image.
- Requesting and/or triggering and/or instructing one of more driving related unit to perform determine and/or perform one or more autonomous driving related operations—for example autonomously driving an autonomous vehicle or performing an autonomous advance driver assistance system (ADAS) operation—for example changing lane or braking without human driver intervention.
- Performing and/or determining one or more autonomous driving related operations.
- Requesting and/or triggering and/or instructing one of more driving related unit to perform determine and/or perform one or more ADAS operations which requires a human driver operation.
- Performing and/or determining one or more ADAS operations which requires a human driver operation.

The Responding may include executing method 300.

It should be noted that the method is applicable to processing SIUs that capture a single object and/or SIUs that are associated with a single bounding shape. It should be noted that the method may ignore one or more bounding shapes associated with the SIU for any reason—for example due to size of object limitation, due to available resource limitations, and the like.

Figure 1B:
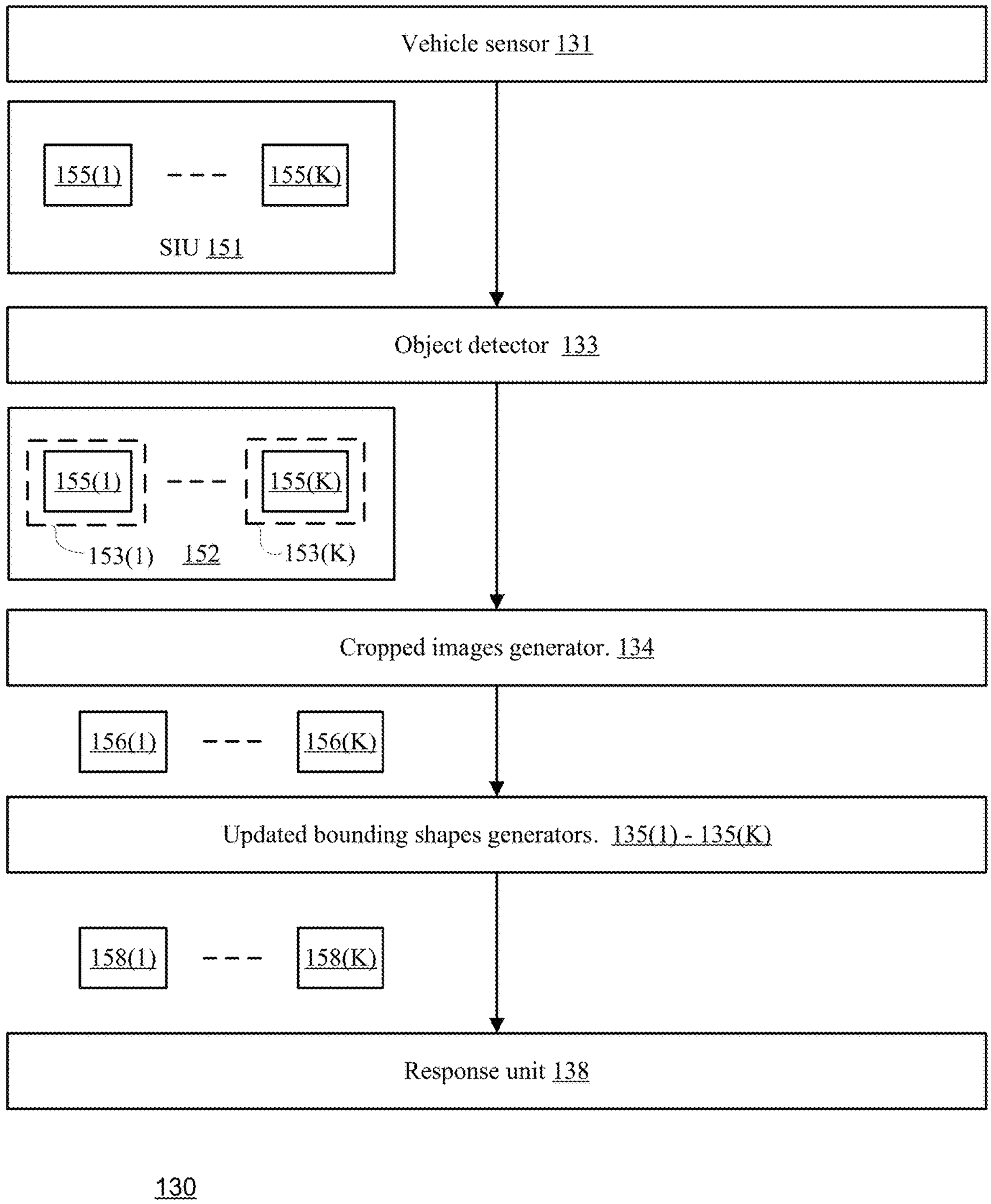
FIG. 1B illustrates an example of a system.

FIG. 1B illustrate an example of a system 130, a SIU 150, a processed SIU 151 with bounding shapes 153(1)-153(K) that surround objects 155(1)-155(K), cropped images 156(1)-156(K), updated bounding shapes 158(1)-158(K).

System 130 may be configured to execute method 100.

System 130 is illustrated as including:

- Vehicle sensor 131 configured to provide SIU 151. The sensor may differ from a vehicle sensor.
- Object detector 133 configured to detect objects and output processed SIU 152 with bounding shapes 153(1)-153(K) that surrounds objects 155(1)-155(K). The object detector can detect objects and/or generate the bounding boxes in any manner. The object detector may be one or more machine learning processes—for example an object detection neural network. K is a positive integer that may exceed one.
- Cropped images generator 134 configured to generate cropped images 156(1)-156(K). When there are multiple bounding shapes that surround multiple objects (captured by the SIU) there are multiple cropped images. A cropped image may consist (or may consist essentially of) the bounding shape (pixels of the SIU within the bounding shape) and insignificant content outside the boudin shape. The cropped image generator may classify pixels to background pixels and foreground pixels. A cropped image will preserve the foreground pixels. The cropped image generator may perform the segmenting based, at least in part, on object metadata generated during a generation of the bounding boxes. Alternatively, the segmenting may be agnostic to object metadata generated during a generation of the bounding shapes.
- Updated bounding shapes generators 135(1)-135(K) configured to receive the cropped images 156(1)-156(K) and generate updated bounding shapes 158(1)-158(K). The updated bounding shapes may be generated in parallel, one after the other or some after the other. There may be a single updated bounding shapes generator.
- Response unit 138 that is configured to respond to the updated bounding shapes 158(1)-158(K).

The system may not include, for example, the vehicle sensor and may not include, for example, the object detector—as the system may receive the SIU with the bounding shapes from another system.

The elements of the system may be in communication with each other in any manner.

The response unit 138 may be a processor and/or a memory unit and/or communication unit and/or an autonomous driving unit and/or an ADAS unit.

The response unit 138 may be in communication with a processor and/or may be in communication with a memory unit and/or may be in communication with another communication unit and/or may be in communication with an autonomous driving unit and/or may be in communication with an ADAS unit.

The response unit may execute at least one of the following and/or may trigger at least one of the following and/or may execute at least a part of one of the following:

Storing the updated bounding boxes.

Processing the updated bounding shapes to provide a driving related content.

Determining at least one distance between a sensor that acquired the sensed information unit and at least one of the objects.

Determining at least one distance between the sensor and the at least one object by detecting a location of a horizon within the image, and using the horizon to determine the at least one distance. The horizon can be viewed in a SIU such as an visible light image.

Performing one or more autonomous driving related operations—for example autonomously driving an autonomous vehicle or performing an autonomous advance driver assistance system (ADAS) operation—for example changing lane or braking without human driver intervention.

Performing one or more ADAS operation which requires a human driver operation.

It should be noted that the system is configured to process SIUs that capture a single object and/or SIUs that are associated with a single bounding shape. It should be noted that the system may ignore one or more bounding shapes associated with the SIU for any reason—for example due to size of object limitation, due to available resource limitations, and the like.

Figure 1C:
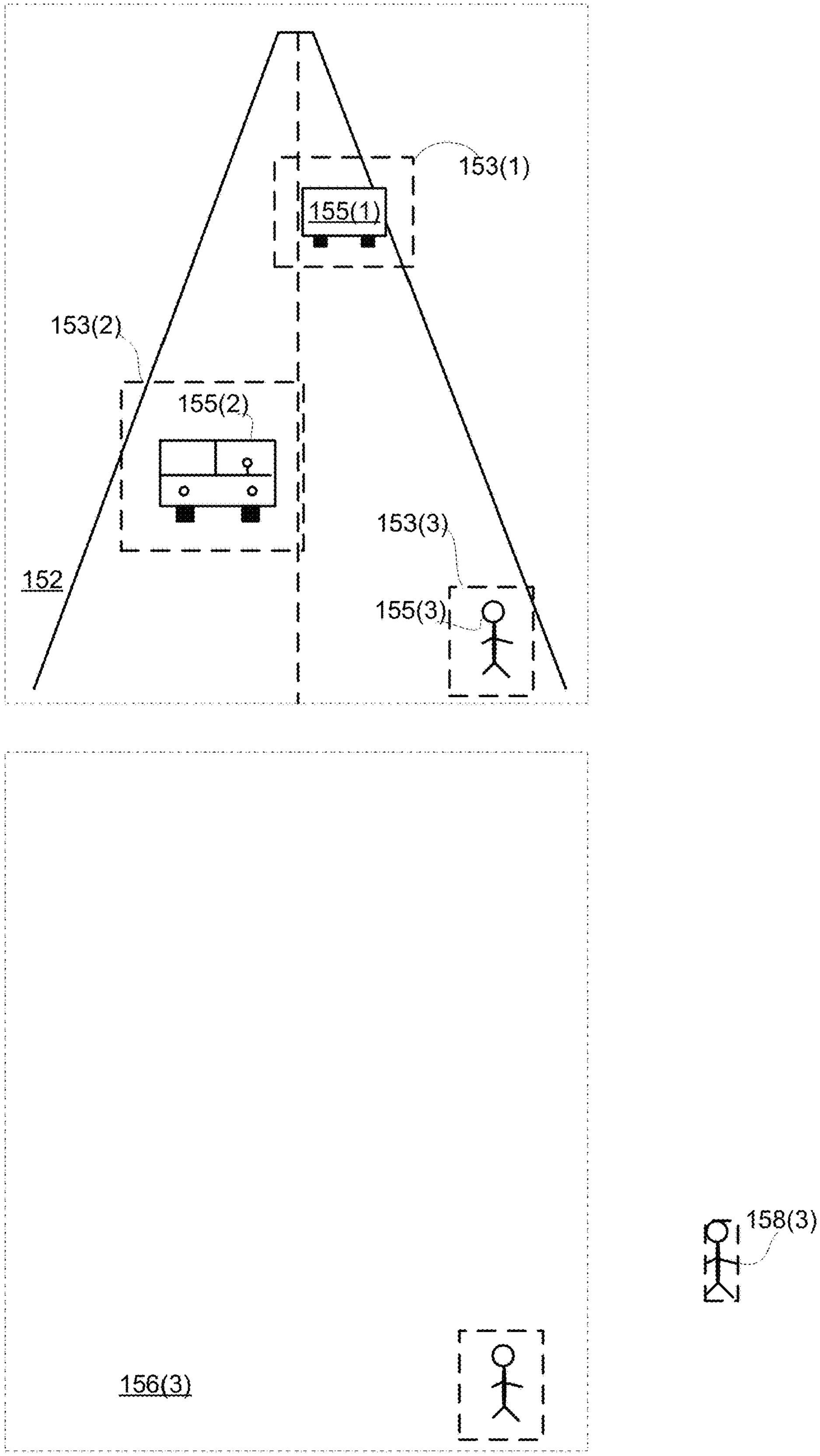
FIG. 1C illustrates examples of a processed sensed information unit, objects and bounding shapes.

FIG. 1C illustrates an example of a processed SIU 152 that captures a pedestrian (third object) 155(3) that is bounded by third bounding shape 155(3), a first vehicle (first object) 155(1) that is bounded by first bounding shape 153(1), and a second vehicle (second object) 155(2) that is bounded by second bounding shape 153(2).

FIG. 1C also illustrates third cropped image 156(3) that includes pixels (from processed SIU) that were bounded by third bounding shape, and a third updated bounding shape 158(3) generated by method 100. Third updated bounding shape is much more compact and fitted to the pedestrian than third bounding shape 155(3).

Figure 1D:
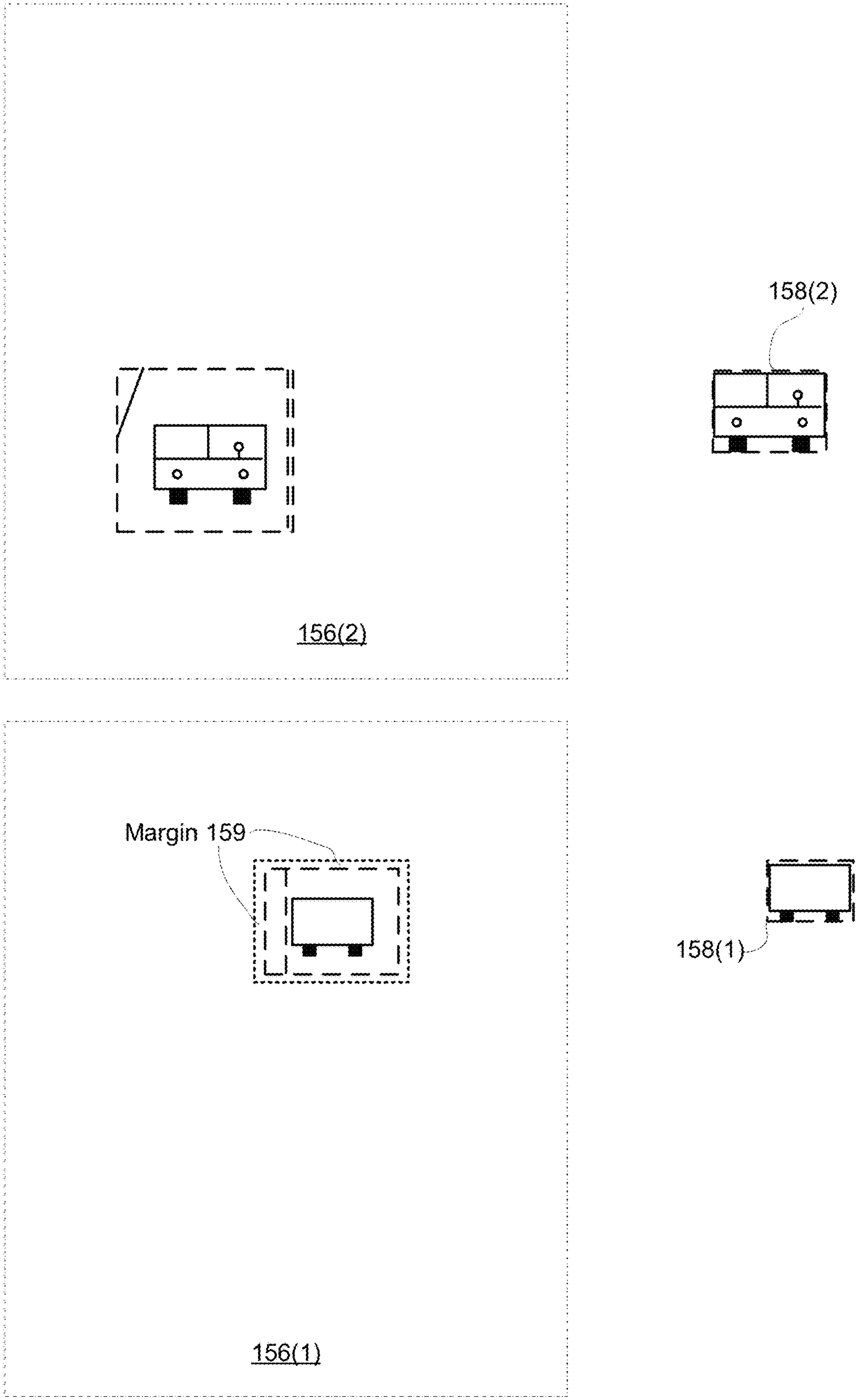
FIG. 1D illustrates examples of cropped images and updated bounding shapes.

FIG. 1D illustrates second cropped image 156(2) that includes pixels (from processed SIU) that were bounded by second bounding shape, and a second updated bounding shape 158(2) generated by method 100. The second updated bounding shape is much more compact and fitted to the second vehicle than second bounding shape 155(2).

FIG. 1D also illustrates first cropped image 156(1) that includes pixels (from processed SIU) that were bounded by first bounding shape, and a first updated bounding shape 158(1) generated by method 100. The first updated bounding shape is much more compact and fitted to the first vehicle than first bounding shape 155(1).

There may be provide a system, a method, and a non-transitory computer readable medium for determining a dimension of an object.

Figure 2A:
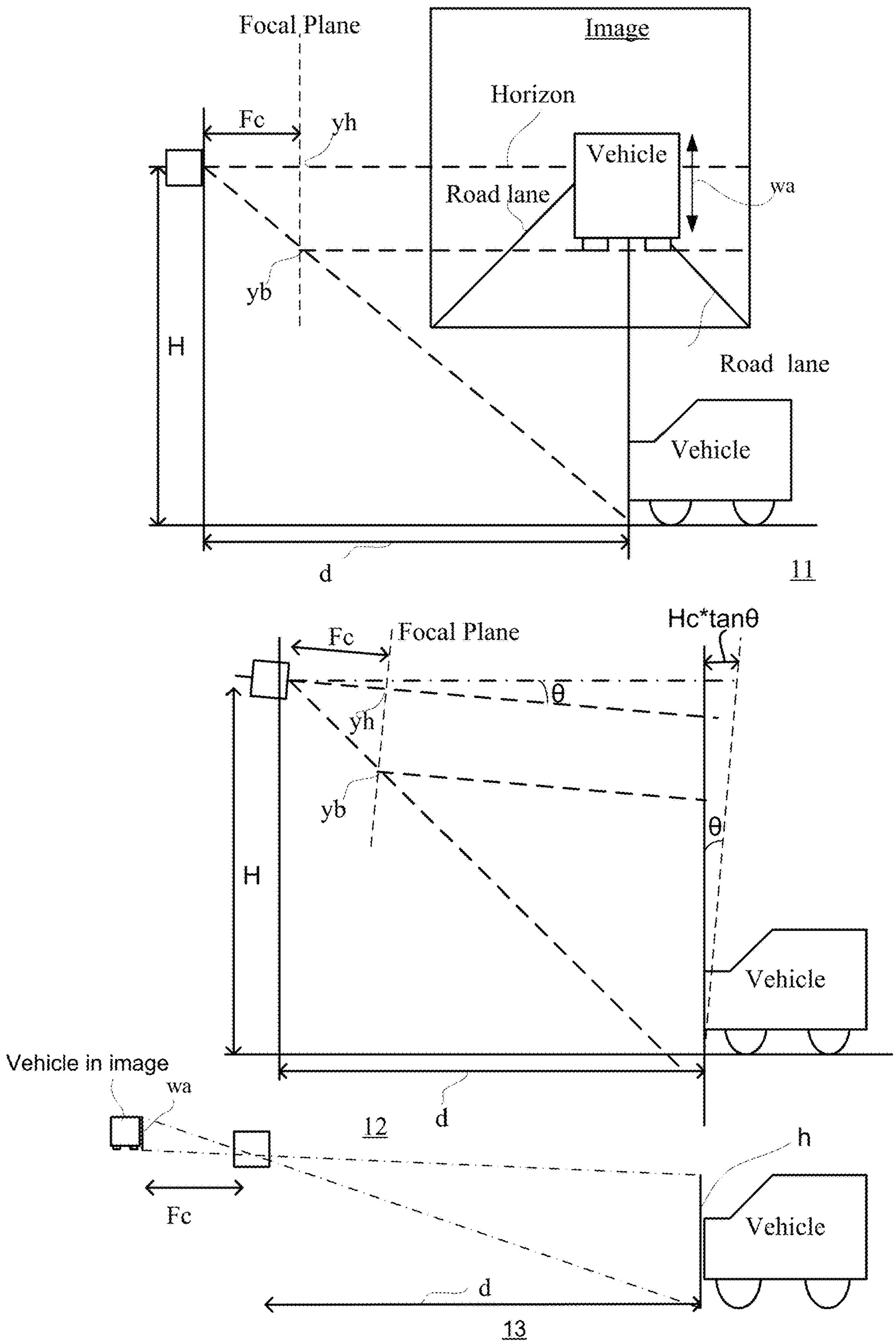
FIG. 2A illustrates an example of a horizon calculation.

FIG. 2A includes two images—one illustrates a calculation of a distance between a vehicle camera that captures an image in which an object appears, and the object—when the vehicle camera is horizontal—and one image illustrates the calculation when there is a pitch angle.

When the camera is horizontal—the distance is calculated by $d=(F_C-H_C)/(y_b-y_h)$.

Wherein d is the distance between the vehicle camara and the object, $F_C$ is a distance between the vehicle camera and an image plane, $H_C$ is a distance between the vehicle camara and the road (may be regarded as the height of the vehicle camera), $y_b$ is a line (row) in the image of a point of contact between the object and the road (bottom line), and $y_h$ is a line (row) in the image of the horizon.

This equation provides inaccurate results if the optical axis of the vehicle camera is not horizontal—where there is a non-zero pitch angle. A positive non-zero pitch angle of the vehicle angle "moves" the horizon downwards in the image while a negative non-zero pitch angle of the vehicle angle "moves" the horizon upwards in the image. These movements may introduce significant errors in the value of $y_h$.

When there is a non-xero vehicle camera pitch angle then the distance is calculated by $$d = \frac{1}{\cos^2\theta} * \frac{Fc * H}{yc - yh} - H * \tan\theta$$

Wherein θ is the pitch angle of the vehicle camera and H is a horizon estimate.

FIG. 2A also illustrates the relationships between the dimension (h) of the vehicle, the dimension of the vehicle within the image (wa), the focal length of the vehicle camera $F_C$ and the distance d between the object and the vehicle camera.

Figure 2B:
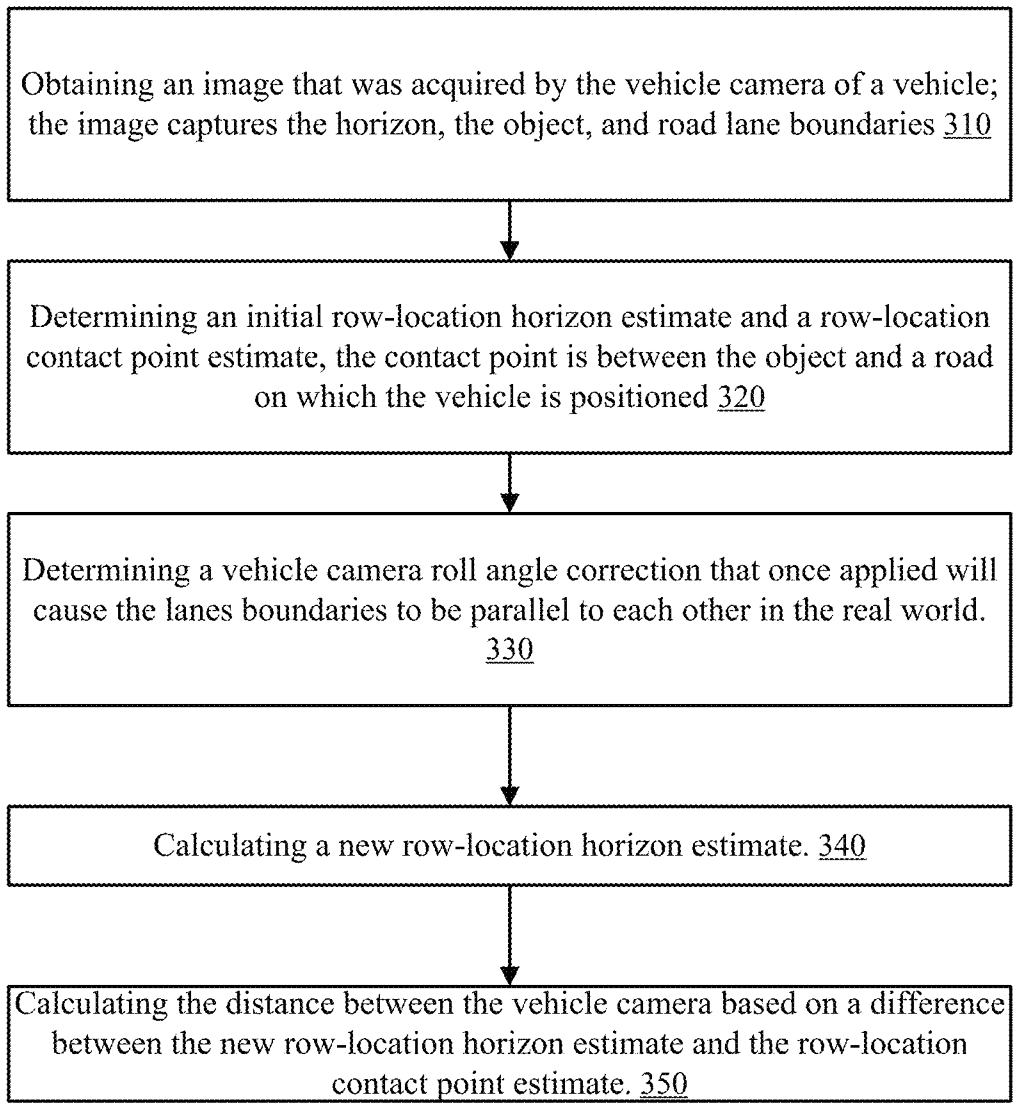
FIG. 2B illustrates an example of a method.

FIG. 2B illustrates an example of a method 300 for calculating a distance between a vehicle camera and an object—which also includes determining the camera pitch angle.

Method 300 may start by step 310 of obtaining an image that was acquired by the vehicle camera of a vehicle. The image captures the horizon, the object, and road lane boundaries.

Step 310 may be followed by step 320 of determining an initial row-location horizon estimate and a row-location contact point estimate. The vehicle and the object contact the same road. The contact point represent a contact between the object vehicle and the road.

Step 320 may include applying the following equation: $d=(F_C-H_C)/(y_b-y_h)$.

Step 320 may be followed by step 330 of determining a vehicle camera pitch angle correction that once applied will cause the road lanes boundaries to be parallel to each other in the real world.

Step 330 may be executed in an iterative manner, in an analytical manner, and the like.

Since the horizon ($y_h$) is used in the equation $d=(F_C-H_C)/(y_b-y_h)$ it directly affects the coordinates of each line point in the world coordinates. The rest of the parameters in the equation are constant.

Step 330 may be followed by step 340 of calculating a new row-location horizon estimate.

The calculating of the new row-location may include updating the row-location horizon estimate based on the vehicle camera pitch angle correction. If the camera is tilted downwards the updating may include moving the row-location horizon estimate upwards—and vice verse.

Step 340 may be followed by step 350 of calculating the distance between the vehicle camera based on a difference between the new row-location horizon estimate and the row-location contact point estimate.

Steps 320, 330, 340 and 350 may be executed by a vehicle processing circuit, in real time, and per image. Thus—they may be executed tens of times per second.

The following example illustrates various steps that can be applied once per each frame or once for each set of frames (for example once per first lane boundary estimate).

A. The steps may include transforming pixel (Xim, Yim) coordinates to the world (Xw, Zw) coordinates done with the following equations:
   a. For the longitudinal axis, Zw=(Fc*Hc)/(Yb−Yh)
   b. Where $F_C$ is camera focal length, $H_C$ is camera height, Yh is the vertical coordinates of the horizon and Yb is the vertical coordinates of the lane point (Yim).
   c. For the lateral axis, Xw=($H_C$*(Xim−Cx))/(Yb−Yh).

Where Hc is camera height, Xim is x image, Cx is the center x, Yh is the vertical coordinates of the horizon and Yb is the vertical coordinates of the lane point (Yim).

B. Initializing the location of the horizon (may be set in advance, may be determined based on previous frames, based on the location of the acquisition of the image, and the like).
C. Getting an estimate of a right lane border and a left lane border.
D. Determining a lane segment that has both right lane border and left lane border.
E. Selecting within the lane segment samples points at multiple distances. For example select 5, 10, 50, 20 and the like distances (in the real world) and select a right lane border point and left border point per distance.
F. For each z-axis distance—calculating the (real world) estimated land width (x axis distance) between a right lane border point and left border point of that z-axis distance to obtain multiple estimated lane widths—one estimated lane width per z-axis distance.
E. Checking the validity of each estimated land width (for example whether it is within an expected lane width value).
F. Calculating, based on the estimated land widths and the z-axis distances between the estimated land widths—lane borders slopes—rate of change of estimated land width over the z-axis.

The amount of horizon correction (y-axis of the image) may be a function of the rate of change of estimated land width over the z-axis—for example may be the rate of change of estimated land width over the z-axis multiplied by a factor (for example 2-20, 6, and the like). The amount of horizon correction may be clipped—in order to provide a moderate change.

G. After setting the new horizon—jumping to getting a new estimate of the right lane border and a left lane border.

Figure 3:
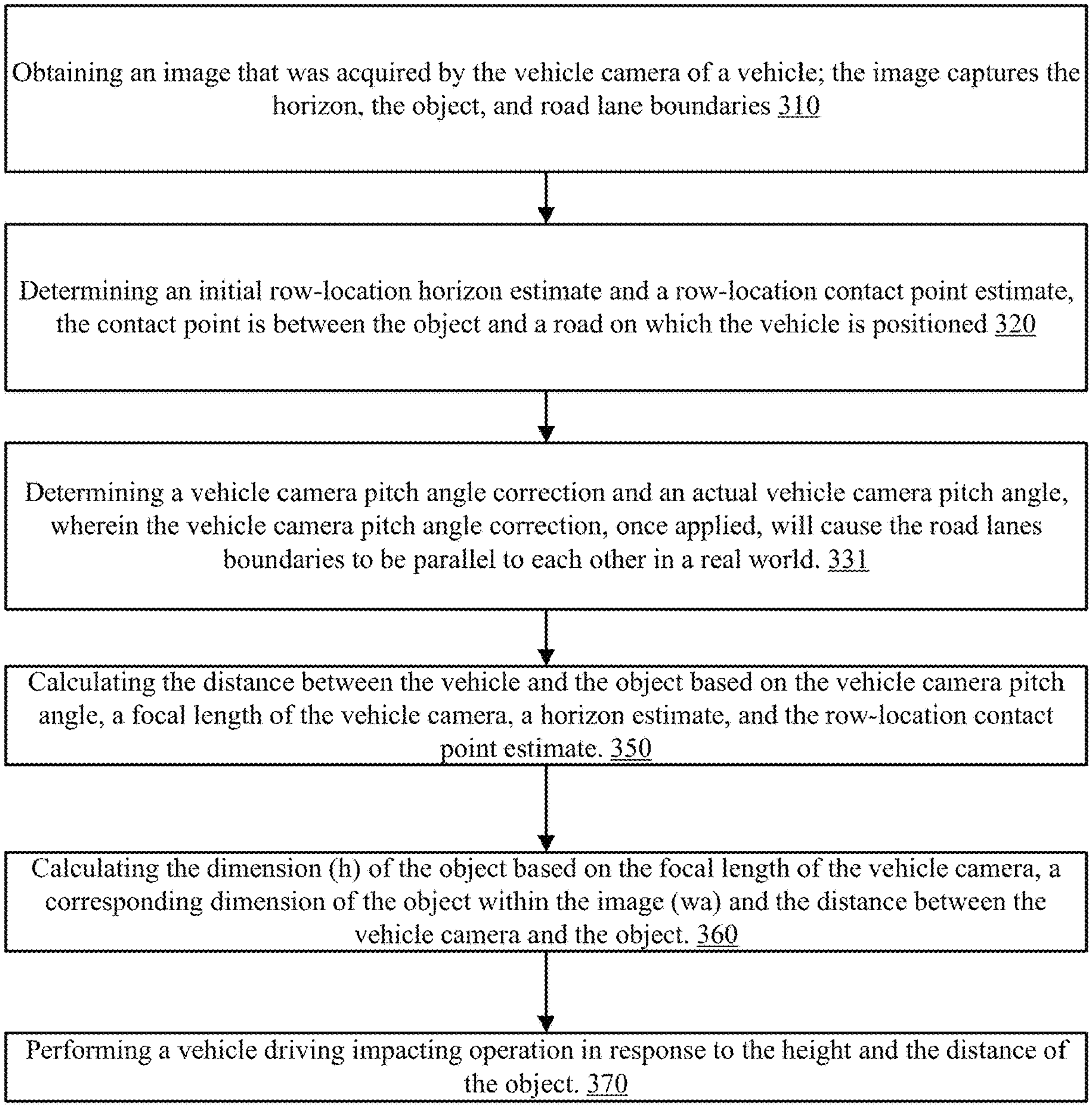
FIG. 3 illustrates an example of a method.

FIG. 3 illustrates an example of a method 400 for calculating a dimension of an object. Method 400 may include executing method 100 or may use at least one of the byproducts of method 100. For example—method 400 may include receiving an updated bounding shape and process—for example may determine the row-location point based on the content of the updated bounding box, may use the dimension of the updated bounding box as a dimension of an object, and the like.

Method 400 may start by step 310 of obtaining an image that was acquired by a vehicle camera of a vehicle. The image captures the horizon, the object, and road lane boundaries.

Step 310 may be followed by step 320 of determining an initial row-location horizon estimate and a row-location contact point estimate. The vehicle and the object contact the same road. The row-location contact point estimate represents a contact between the object and a road on which the vehicle is positioned.

Step 320 may be followed by step 330 of determining a vehicle camera pitch angle correction and an actual vehicle camera pitch angle. The vehicle camera pitch angle correction, once applied, will cause the road lanes boundaries to be parallel to each other in a real world.

Step 330 may be followed by step 350 of calculating the distance between the vehicle and the object based on the vehicle camera pitch angle (θ), a focal length (Fc) of the vehicle camera, a horizon estimate (H), the row-location contact point estimate (yb).

Step 350 may include calculating:

$$d = \frac{1}{\cos^2\theta} * \frac{Fc * H}{yc - yh} - H * \tan\theta.$$

The dimension of the object may be a height of the object—or another dimension.

The horizon estimate H may be an initial row-location horizon estimate

Method 300 may include calculating a new row-location horizon estimate, wherein the calculating may include updating the row-location horizon estimate based on the vehicle camera pitch angle correction.

The horizon estimate H may be the new row-location horizon estimate

Step 350 may be followed by step 360 of calculating the dimension (h) of the object based on the focal length of the vehicle camera, a corresponding dimension of the object within the image (wa) and the distance between the vehicle camera and the object. This may be done using triangle similarities.

Step 360 may include multiplying the distance by a ratio between the (i) the dimension of the object within the image, and (ii) the focal length of the camera.

Step 360 may be followed by step 370 of performing a vehicle driving impacting operation in response to the height and the distance of the object.

Step 370 may include autonomously driving the based on the dimension of the object and the distance between the vehicle and the object.

Step 370 may include performing a driver assistance operation (for example—alerting a driver, suggesting a driving path or other action to the driver, performing an emergency breaking, performing a lane related driving operation, and the like).

Steps 320-370 may be executed by a vehicle processing circuit, in real time, and per image. Real time may include multiple time per second (for example at least 5, 10, 20, 30, 40, 50, 60, 100, 200 times a second).

The suggested method provide a distance estimate between the object and the vehicle camera and the dimension of the object in a highly accurate manner (determination based on locations of the horizon in the image), and also relatively simple (which saves computational and memory resources)—especially as the method may use the byproduct of lane detection process (locations of lanes)—which are generated for multiple other purposes (such as determining the location of the vehicle, maintaining lane, and the like). The method may operate even when the vehicle camera is not horizontal—even when there is a non-zero pitch angle—and is also robust.

The method may be executed in real time—which is mandatory as various autonomous driving operations and/or driving assistance operations must be executed in real time—and processing images that may include even millions of pixels is a highly complex task that requires non-transitory processors and/or processing circuits.

Figure 4:
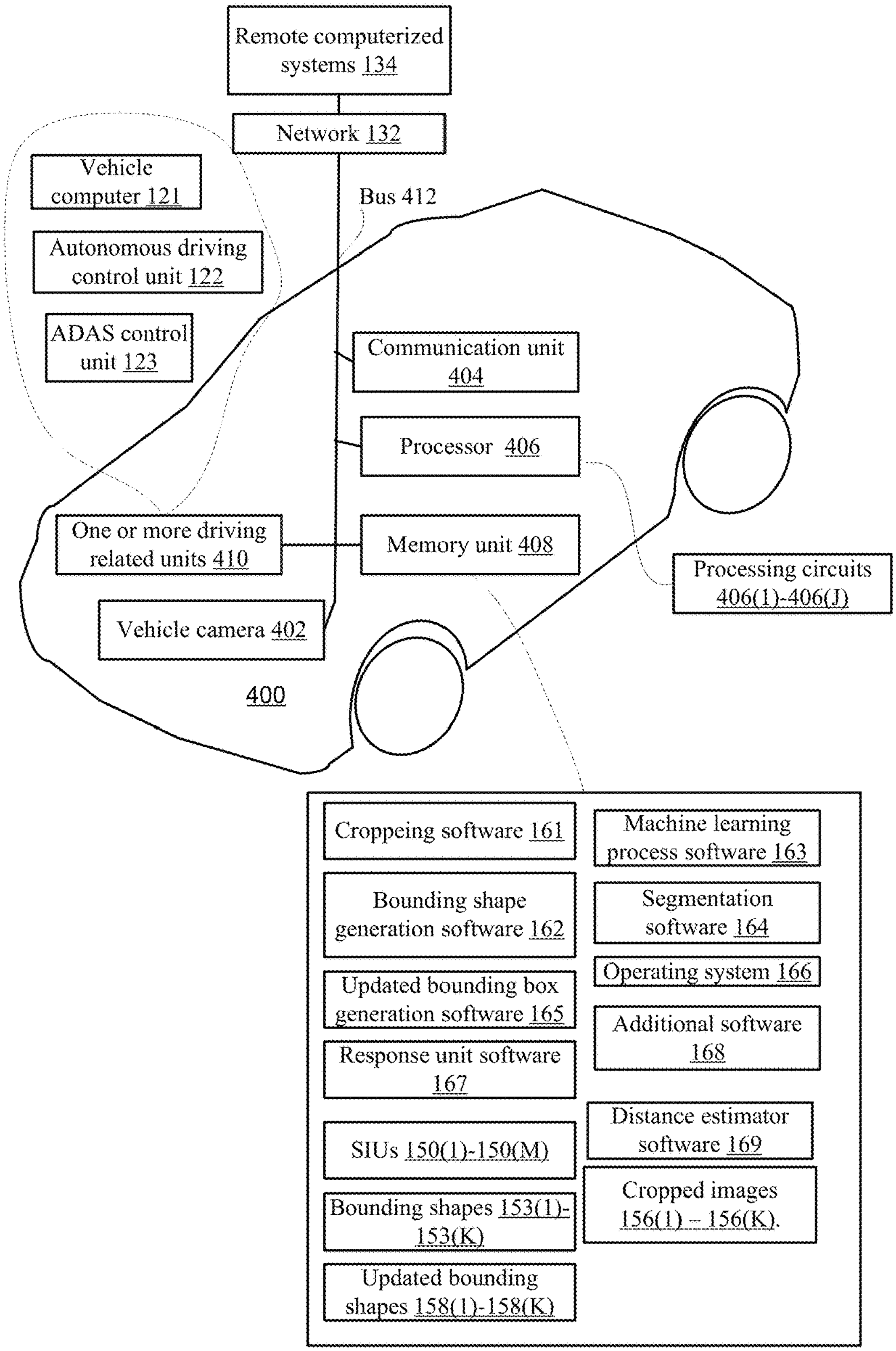
FIG. 4 illustrates an example of a vehicle.

FIG. 4 illustrates an example of vehicle 400. Vehicle 400 may include system 130. It should be noted that there may be at least a partial overlap between the components/units/elements of vehicle 400 of FIG. 1 and system 130 of FIG. 1B.

Vehicle 400 may include:

- A sensing unit that includes one or more sensors of any type—such as vehicle camera 402 (or any number of any sensing units).
- Processor 406 that may include one or more processing circuits—such as processing circuits 506(1)-406(J).
- Memory unit 408 for storing information and/or instructions.
- Communication unit 404 that may be configured to communicate with components in the vehicle and/or outside the vehicle (such as network 132 in communication with remote computerized systems 134).
- One or more driving related units 410 such as (i) one or more autonomous driving units (such as autonomous driving control unit 122) that is configured to control or otherwise execute autonomous driving and/or (ii) one or more driver assistance units such as ADAS units (such as ADAS control unit 123) and/or one or more vehicle computers (such as vehicle computer 121 configured to control the vehicle or parts of the vehicle). The vehicle is configured to execute any of the mentioned above methods.

FIG. 4 also illustrates base 412 that allows communication between various units.

The memory unit is illustrates as storing cropping software 161 (for generating cropped images), bounding shape generation software 162 for calculating bounding shapes, machine learning process software 163 for executing any state or sub-stage of method 100 and/or method 300 and/or 400 using a machine learning process, segmentation software 164 for performing any segmentation required during the execution of any of the methods, updated bounding shape generation software 165 for calculating updated bounding shapes, operating systems 166, response unit software 167 for performing any response mentioned in any of the methods, distance estimator software 169 for estimating distance, SIUs 150(1)-150(M), bounding shapes 153(1)-153(K), cropped images 156(1)-156(K), and updated bounding shapes 158(1)-158(K).

According to an embodiment there is provided a method that is computer implemented and for segmentation-based generation of bounding shapes, the method includes (i) obtaining a bounding shape that bounds an object captured in a sensed information unit; (ii) generating a cropped image in correspondence with the bounding shape; (iii) segmenting the cropped image to a cropped image background and a cropped image foreground; and (iv) generating an updated bounding shape in correspondence with the cropped image, using the segmentation, the updated bounding shape surrounding the cropped image foreground of the cropped image.

According to an embodiment, the method includes processing the updated bounding shape to produce driving related content.

According to an embodiment, the method includes determining a driving related operation based, at least in part, on the driving related content.

According to an embodiment, with the sensed information unit acquired using a sensor, the processing involves determining a distance between the sensor and the object captured in the sensed information unit.

According to an embodiment, the sensed information unit is at least one image, and wherein the determining of the distance comprises detecting a location of a horizon within the at least one image.

According to an embodiment, the method includes sensing the sensed information unit by a vehicle sensor.

According to an embodiment, the generated cropped image consists essentially of a corresponding object bounded by the bounding shape.

According to an embodiment, the generated cropped image consists essentially of (i) a corresponding object bounded by the bounding shape and (ii) a margin.

According to an embodiment, the generating of the cropped image comprises generating different cropped images for different bounding shapes in parallel.

According to an embodiment, the obtaining comprises feeding the sensed information unit to an object detection neural network.

According to an embodiment, the segmenting is agnostic to object metadata generated during a generation of the bounding shape.

According to an embodiment, there is provided a non-transitory computer readable medium for segmentation-based generation of bounding shapes, the non-transitory computer readable medium stores instructions for: (i) obtaining a bounding shape that bounds an object captured in a sensed information unit; (ii) generating a cropped image in correspondence with the bounding shape; (iii) segmenting the cropped image to a cropped image background and a cropped image foreground; and (iv) generating an updated bounding shape in correspondence with the cropped image, using the segmentation, the updated bounding shape surrounding the cropped image foreground of the cropped image.

According to an embodiment, the non-transitory computer readable medium further stores instructions for processing the updated bounding shape to produce driving related content.

According to an embodiment, the non-transitory computer readable medium further stores instructions for determining a driving related operation based, at least in part, on the driving related content.

According to an embodiment, with the sensed information unit acquired using a sensor, the processing involves determining a distance between the sensor and the object captured in the sensed information unit.

According to an embodiment, the sensed information unit is at least one image, and wherein the determining of the distance comprises detecting a location of a horizon within the at least one image.

According to an embodiment, the non-transitory computer readable medium further stores instructions for sensing the sensed information unit by a vehicle sensor.

According to an embodiment, there is provided a vehicle processing circuit that is configured to: obtain a bounding shape that bounds an object captured in a sensed information unit; generate a cropped image in correspondence with the bounding shape; segment the cropped image to a cropped image background and a cropped image foreground; and generate an updated bounding shape in correspondence with the cropped image, using the segmentation, the updated bounding shape surrounding the cropped image foreground of the cropped image.

According to an embodiment, the vehicle processing circuit is further configured to process the updated bounding shape to produce driving related content; wherein with the sensed information unit acquired using a sensor, the processing involves determining a distance between the sensor and the object captured in the sensed information unit.

According to an embodiment, the sensed information unit is at least one image, and wherein the vehicle processing unit if further configured to determine of the distance comprises detecting a location of a horizon within the at least one image.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuit located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuit or of logical representations convertible into physical circuit, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method that is computer implemented and for segmentation-based generation of bounding shapes, the method comprises:

obtaining a bounding shape that bounds an object captured in a sensed information unit; wherein the obtaining comprises feeding the sensed information unit to an object detection neural network;

generating, by a vehicle processing circuit of the vehicle, a cropped image dedicated to the object in correspondence with the bounding shape;

segmenting the cropped image to a cropped image background and a cropped image foreground; and generating, by the vehicle processing circuit, an updated bounding shape in correspondence with the cropped image, using the segmentation, the updated bounding shape surrounding the cropped image foreground of the cropped image; and responding to the updated bounding shape by autonomously driving a vehicle, under a control of an autonomous control driving unit of the vehicle that comprises one or more processing circuits.

2. The method according to claim 1, further comprising processing the updated bounding shape to produce driving related content.

3. The method according to claim 1, wherein the responding further comprises determining a distance between the object and the vehicle, wherein the autonomously driving is responsive to the distance.

4. The method according to claim 2, wherein with the sensed information unit acquired using a sensor, the processing involves determining a distance between the sensor and the object captured in the sensed information unit.

5. The method according to claim 4, wherein the sensed information unit is at least one image, and wherein the determining of the distance comprises detecting a location of a horizon within the at least one image.

6. The method according to claim 1, wherein the sensed information unit captures another object, and the method further comprises obtaining another bounding shape that bounds the other object and generating another cropped image dedicated to the other object in correspondence with the other bounding shape.

7. The method according to claim 1, wherein the generated cropped image consists essentially of a corresponding object bounded by the bounding shape.

8. The method according to claim 1, wherein the generated cropped image consists essentially of (i) a corresponding object bounded by the bounding shape and (ii) a margin.

9. The method according to claim 8, wherein a dimension of the margin is up to 5 percent of a corresponding dimension of the bounding shape, the dimension is selected of a height and width.

10. The method according to claim 8, wherein at least one of a width and weight of the margin is up to 4 pixels.

11. The method according to claim 1, wherein the segmenting is agnostic to object metadata generated during a generation of the bounding shape.

12. A non-transitory computer readable medium for segmentation-based generation of bounding shapes, the non-transitory computer readable medium stores instructions for:

obtaining a bounding shape that bounds an object captured in a sensed information unit; wherein the obtaining comprises feeding the sensed information unit to an object detection neural network;

generating, by a vehicle processing circuit of the vehicle, a cropped image dedicated to the object in correspondence with the bounding shape; the processor comprising one or more processing circuits;

segmenting the cropped image to a cropped image background and a cropped image foreground;

generating, by the vehicle processing circuit, an updated bounding shape in correspondence with the cropped image, using the segmentation, the updated bounding shape surrounding the cropped image foreground of the cropped image; and responding to the updated bounding shape by autonomously driving the vehicle, under a control of an autonomous control driving unit of the vehicle that comprises one or more processing circuits.

13. The non-transitory computer readable medium according to claim 12, further comprising processing the updated bounding shape to produce driving related content.

14. The non-transitory computer readable medium according to claim 12, wherein the responding further comprises determining a distance between the object and the vehicle, wherein the autonomously driving is responsive to the distance.

15. The non-transitory computer readable medium according to claim 13, wherein with the sensed information unit acquired using a sensor, the processing involves determining a distance between the sensor and the object captured in the sensed information unit.

16. The non-transitory computer readable medium according to claim 15, wherein the sensed information unit is at least one image, and wherein the determining of the distance comprises detecting a location of a horizon within the at least one image.

17. The non-transitory computer readable medium according to claim 12, wherein the sensed information unit captures another object, and the non-transitory computer readable medium further stores instructions for obtaining another bounding shape that bounds the other object and generating another cropped image dedicated to the other object in correspondence with the other bounding shape.

18. A vehicle processing circuit that is configured to: obtain a bounding shape that bounds an object captured in a sensed information unit wherein the obtaining comprises feeding the sensed information unit to an object detection neural network; generate a cropped image in correspondence with the bounding shape; segment the cropped image to a cropped image background and a cropped image foreground; and generate an updated bounding shape in correspondence with the cropped image, using the segmentation, the updated bounding shape surrounding the cropped image foreground of the cropped image; and respond to the updated bounding shape by autonomously driving the vehicle, under a control of an autonomous control driving unit of the vehicle that comprises one or more processing circuits.

19. The vehicle processing circuit according to claim 18, wherein the responding further comprises determining a distance between the object and the vehicle, wherein the autonomously driving is responsive to the distance.

20. The vehicle processing circuit according to claim 18, wherein the sensed information unit is at least one image, and wherein the vehicle processing unit if further configured to determine of the distance comprises detecting a location of a horizon within the at least one image.

* * * * *